United States Patent
McAlister (10) Patent No.: US 9,097,152 B2
(45) Date of Patent: Aug. 4, 2015

(54) ENERGY SYSTEM FOR DWELLING SUPPORT

(75) Inventor: Roy E. McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 324 days.

(21) Appl. No.: 12/857,502

(22) Filed: Aug. 16, 2010

(65) Prior Publication Data

US 2011/0041784 A1   Feb. 24, 2011

Related U.S. Application Data

(63) Continuation-in-part of application No. 12/707,651, filed on Feb. 17, 2010, now Pat. No. 8,075,748, and a continuation-in-part of application No. PCT/US2010/024497, filed on Dec. 17, 2010, and a (Continued)

(51) Int. Cl.
    *F02B 63/04* (2006.01)
    *F01N 5/02* (2006.01)

(52) U.S. Cl.
    CPC ... *F01N 5/02* (2013.01); *Y02T 10/16* (2013.01)

(58) Field of Classification Search
    USPC .................. 237/19; 123/3; 290/2; 60/320
    See application file for complete search history.

(56) References Cited

U.S. PATENT DOCUMENTS

| | | | |
|---|---|---|---|
| 1,849,154 A * | 3/1932 | Rehm et al. | 219/535 |
| 2,208,157 A * | 7/1940 | Grutzner | 237/8 A |
| 2,398,828 A | 4/1946 | Gray | |
| 3,805,082 A * | 4/1974 | Murray | 290/1 R |
| 3,888,896 A | 6/1975 | Espino et al. | |
| 4,105,755 A | 8/1978 | Darnell et al. | |
| 4,124,481 A | 11/1978 | Ramer | |
| 4,172,506 A | 10/1979 | Terry | |
| 4,200,505 A | 4/1980 | Day et al. | |
| 4,319,635 A | 3/1982 | Jones | |

(Continued)

FOREIGN PATENT DOCUMENTS

| CN | 101306302 A | 11/2008 |
|---|---|---|
| DE | 2934647 A1 | 3/1981 |

(Continued)

OTHER PUBLICATIONS

Wentzel, DE3014357 A1 English machine translation, Oct. 22, 1981.*

(Continued)

*Primary Examiner* — Alissa Tompkins
*Assistant Examiner* — Phillip E Decker
(74) *Attorney, Agent, or Firm* — Perkins Coie LLP (57) ABSTRACT

The present disclosure is directed to a system and method of providing energy to a dwelling. An engine is housed within an inner tank, which is in turn housed within an outer tank. The engine provides electricity which is used for a dwelling. Exhaust fumes from the engine are piped through a series of heat-exchanging tubes within the outer tank to heat potable water within the outer tank. Water enters the potable tank at a bottom of the tank, and warms as it rises through the outer tank toward an outlet near a top of the outer tank. Hot, potable water is provided from the top of the outer tank to the dwelling. Condensate from the exhaust is captured and used as potable water. Heat, vibration, and acoustic energy from the engine is captured by the fluid in the inner tank and transferred to the outer tank.

28 Claims, 4 Drawing Sheets

Related U.S. Application Data continuation-in-part of application No. 12/707,653, filed on Feb. 17, 2010, now Pat. No. 8,172,990, and a continuation-in-part of application No. 12/707,656, filed on Feb. 17, 2010, now Pat. No. 8,075,749, and a continuation-in-part of application No. PCT/US2010/024499, filed on Feb. 17, 2010, and a continuation-in-part of application No. PCT/US2010/024498, filed on Feb. 17, 2010.

(60) Provisional application No. 61/153,253, filed on Feb. 17, 2009, provisional application No. 61/237,476, filed on Aug. 27, 2009, provisional application No. 61/304,403, filed on Feb. 13, 2010.

(56) References Cited

U.S. PATENT DOCUMENTS

| | | | | |
|---|---|---|---|---|
| 4,341,607 | A | 7/1982 | Tison | |
| 4,341,608 | A | 7/1982 | St. John | |
| 4,382,189 | A | 5/1983 | Wilson | |
| 4,386,801 | A | 6/1983 | Chapman et al. | |
| 4,389,288 | A | 6/1983 | Vaughan | |
| 4,395,316 | A | 7/1983 | St. John | |
| 4,426,037 | A * | 1/1984 | Bernstein | 237/19 |
| 4,437,954 | A | 3/1984 | Sammells et al. | |
| 4,455,045 | A | 6/1984 | Wheeler | |
| 4,468,235 | A | 8/1984 | Hill | |
| 4,601,508 | A | 7/1986 | Kerian | |
| 4,611,847 | A | 9/1986 | Sullivan | |
| 4,620,900 | A | 11/1986 | Kimura et al. | |
| 4,657,290 | A * | 4/1987 | Linden | 290/2 |
| 4,736,111 | A * | 4/1988 | Linden | 290/2 |
| 4,746,160 | A | 5/1988 | Wiesemeyer | |
| 4,896,507 | A | 1/1990 | Hosford | |
| 4,902,307 | A | 2/1990 | Gavalas et al. | |
| 4,978,162 | A | 12/1990 | Labbe | |
| 4,985,055 | A | 1/1991 | Thorne et al. | |
| 5,024,818 | A | 6/1991 | Tibbetts et al. | |
| 5,058,945 | A | 10/1991 | Elliott, Sr. et al. | |
| 5,119,897 | A | 6/1992 | Moriwake | |
| 5,132,007 | A | 7/1992 | Meyer et al. | |
| 5,222,698 | A | 6/1993 | Nelson et al. | |
| 5,259,870 | A | 11/1993 | Edlund | |
| 5,280,990 | A | 1/1994 | Rinard | |
| 5,323,061 | A * | 6/1994 | Immler et al. | 290/2 |
| 5,343,699 | A | 9/1994 | McAlister | |
| 5,407,245 | A | 4/1995 | Geropp | |
| 5,498,059 | A | 3/1996 | Switlik | |
| 5,560,443 | A | 10/1996 | DuBose | |
| 5,617,504 | A * | 4/1997 | Sciacca et al. | 392/307 |
| 5,662,389 | A | 9/1997 | Truglio et al. | |
| 5,719,990 | A * | 2/1998 | Yang | 392/400 |
| 5,806,553 | A * | 9/1998 | Sidwell | 137/487.5 |
| 5,903,060 | A * | 5/1999 | Norton | 237/8 D |
| 5,986,429 | A | 11/1999 | Mula, Jr. | |
| 6,015,065 | A | 1/2000 | McAlister | |
| 6,068,328 | A | 5/2000 | Gazdzinski | |
| 6,081,183 | A | 6/2000 | Mading et al. | |
| 6,083,377 | A | 7/2000 | Lin et al. | |
| 6,090,266 | A | 7/2000 | Roychowdhury | |
| 6,092,861 | A | 7/2000 | Whelan | |
| 6,151,891 | A * | 11/2000 | Bennett | 60/298 |
| 6,155,212 | A | 12/2000 | McAlister | |
| 6,200,069 | B1 | 3/2001 | Miller | |
| 6,216,599 | B1 | 4/2001 | Cavanagh | |
| 6,220,193 | B1 | 4/2001 | Dilks | |
| 6,309,010 | B1 | 10/2001 | Whitten | |
| 6,378,932 | B1 | 4/2002 | Fasel et al. | |
| 6,402,810 | B1 | 6/2002 | Mayer et al. | |
| 6,409,252 | B1 | 6/2002 | Andrus | |
| 6,446,597 | B1 | 9/2002 | McAlister | |
| 6,468,684 | B1 | 10/2002 | Chisholm et al. | |
| 6,500,313 | B2 | 12/2002 | Sherwood | |
| 6,502,533 | B1 | 1/2003 | Meacham | |
| 6,503,584 | B1 | 1/2003 | McAlister | |
| 6,516,754 | B2 * | 2/2003 | Chadwick | 122/19.1 |
| 6,525,431 | B1 * | 2/2003 | Clucas et al. | 290/2 |
| 6,604,356 | B1 * | 8/2003 | Mills et al. | 60/275 |
| 6,606,860 | B2 * | 8/2003 | McFarland | 60/648 |
| 6,749,043 | B2 | 6/2004 | Brown et al. | |
| 6,755,899 | B2 | 6/2004 | Nagai | |
| 6,756,140 | B1 | 6/2004 | McAlister | |
| 6,757,591 | B2 | 6/2004 | Kramer | |
| 6,784,562 | B2 * | 8/2004 | Gennesseaux | 290/2 |
| 6,838,782 | B2 | 1/2005 | Vu | |
| 6,854,788 | B1 | 2/2005 | Graham | |
| 6,897,575 | B1 | 5/2005 | Yu | |
| 6,926,345 | B2 | 8/2005 | Ortega et al. | |
| 6,979,049 | B2 | 12/2005 | Ortega et al. | |
| 6,984,305 | B2 | 1/2006 | McAlister | |
| 7,062,913 | B2 | 6/2006 | Christensen et al. | |
| 7,152,908 | B2 | 12/2006 | Shahbazi | |
| 7,165,804 | B2 | 1/2007 | Shahbazi | |
| 7,185,944 | B2 | 3/2007 | Shahbazi | |
| 7,207,620 | B2 | 4/2007 | Cosgrove et al. | |
| 7,210,467 | B2 | 5/2007 | Kweon et a | |
| 7,211,905 | B1 | 5/2007 | McDavid, Jr. | |
| 7,237,827 | B2 | 7/2007 | Shahbazi | |
| 7,243,980 | B2 | 7/2007 | Vala | |
| 7,254,944 | B1 | 8/2007 | Goetzinger et al. | |
| 7,364,810 | B2 | 4/2008 | Sridhar et al. | |
| 7,427,189 | B2 | 9/2008 | Eyb | |
| 7,632,338 | B2 | 12/2009 | Cipollini | |
| 7,797,183 | B2 | 9/2010 | Dias et al. | |
| 7,827,974 | B2 | 11/2010 | Beckmann | |
| 7,931,784 | B2 | 4/2011 | Medoff | |
| 8,165,968 | B2 | 4/2012 | Ramesh et al. | |
| 8,187,549 | B2 | 5/2012 | Mcalister | |
| 8,187,550 | B2 | 5/2012 | Mcalister | |
| 8,285,635 | B2 | 10/2012 | Rhodes, III | |
| 8,313,556 | B2 | 11/2012 | Mcalister | |
| 8,595,020 | B2 | 11/2013 | Marino | |
| 2001/0035093 | A1 | 11/2001 | Yokota | |
| 2002/0007845 | A1 | 1/2002 | Collette et al. | |
| 2002/0158530 | A1 * | 10/2002 | Gennesseaux | 310/112 |
| 2003/0012985 | A1 | 1/2003 | McAlister | |
| 2003/0018487 | A1 | 1/2003 | Young et al. | |
| 2003/0039608 | A1 | 2/2003 | Shah et al. | |
| 2003/0062270 | A1 | 4/2003 | McAlister | |
| 2004/0089439 | A1 * | 5/2004 | Treverton et al. | 165/41 |
| 2004/0124095 | A1 | 7/2004 | Fujimura et al. | |
| 2004/0126632 | A1 | 7/2004 | Pearson et al. | |
| 2005/0003247 | A1 | 1/2005 | Pham | |
| 2005/0015287 | A1 | 1/2005 | Beaver | |
| 2005/0052029 | A1 * | 3/2005 | Aldridge et al. | 290/2 |
| 2005/0109394 | A1 | 5/2005 | Anderson | |
| 2006/0005738 | A1 | 1/2006 | Kumar | |
| 2006/0005739 | A1 | 1/2006 | Kumar | |
| 2006/0011472 | A1 | 1/2006 | Flick | |
| 2006/0048770 | A1 | 3/2006 | Meksvanh et al. | |
| 2006/0049063 | A1 | 3/2006 | Murphy et al. | |
| 2006/0100336 | A1 * | 5/2006 | Fukui | 524/430 |
| 2006/0100897 | A1 | 5/2006 | Halloran et al. | |
| 2006/0162554 | A1 | 7/2006 | Kelley | |
| 2006/0257310 | A1 | 11/2006 | Tada et al. | |
| 2006/0286518 | A1 | 12/2006 | Yoder | |
| 2007/0138006 | A1 | 6/2007 | Oakes et al. | |
| 2007/0220887 | A1 | 9/2007 | Monostory et al. | |
| 2008/0050800 | A1 | 2/2008 | McKeeman et al. | |
| 2008/0078675 | A1 | 4/2008 | Kawahara et al. | |
| 2008/0088135 | A1 | 4/2008 | Novo Vidal | |
| 2008/0102329 | A1 | 5/2008 | Hollinger | |
| 2008/0115415 | A1 | 5/2008 | Agrawal et al. | |
| 2008/0138675 | A1 | 6/2008 | Jang et al. | |
| 2008/0245672 | A1 | 10/2008 | Little et al. | |
| 2008/0303348 | A1 | 12/2008 | Witters | |
| 2008/0318092 | A1 | 12/2008 | Sridhar et al. | |
| 2009/0016948 | A1 | 1/2009 | Young | |
| 2009/0169452 | A1 | 7/2009 | Constantz et al. | |
| 2009/0215137 | A1 | 8/2009 | Hawkins et al. | |
| 2009/0217584 | A1 | 9/2009 | Raman et al. | |
| 2009/0222307 | A1 | 9/2009 | Beaver | |
| 2009/0235587 | A1 | 9/2009 | Hawkes et al. | |

(56) References Cited

U.S. PATENT DOCUMENTS

| | | |
|---|---|---|
| 2009/0263540 A1 | 10/2009 | Allen et al. |
| 2009/0266075 A1 | 10/2009 | Westmeier et al. |
| 2009/0276265 A1 | 11/2009 | Ahmed et al. |
| 2010/0101231 A1 | 4/2010 | Westmeier |
| 2010/0107994 A1 | 5/2010 | Moriarty et al. |
| 2010/0306002 A1 | 12/2010 | Dias et al. |
| 2011/0061295 A1 | 3/2011 | Mcalister |
| 2011/0070510 A1 | 3/2011 | Mcalister |
| 2011/0081586 A1 | 4/2011 | Mcalister |
| 2011/0198211 A1 | 8/2011 | Mcalister |
| 2011/0200897 A1 | 8/2011 | Mcalister |
| 2011/0230573 A1 | 9/2011 | Mcalister |
| 2012/0271677 A1 | 10/2012 | Rhodes, Iii |
| 2012/0323619 A1 | 12/2012 | Risz et al. |

FOREIGN PATENT DOCUMENTS

| | | |
|---|---|---|
| DE | 3014357 A1 | 10/1981 |
| DE | 3016410 A1 | 11/1981 |
| EP | 2103682 | 9/2009 |
| GB | 2 248 230 A | 1/1992 |
| GB | 2387641 A | 10/2003 |
| JP | 04-076211 | 3/1992 |
| JP | 05-223268 | 8/1993 |
| JP | 07-113567 | 5/1995 |
| JP | 2000-205044 | 7/2000 |
| JP | 2000-297700 | 10/2000 |
| JP | 2002-119822 | 4/2002 |
| JP | 2006-128006 | 5/2006 |
| JP | 4357969 B2 | 8/2009 |
| KR | 10-0808736 | 2/2008 |
| KR | 10-090119098 | 11/2009 |
| WO | WO-01-56938 | 8/2001 |
| WO | WO-2006119118 A2 | 11/2006 |
| WO | WO-2006-136860 | 12/2006 |
| WO | WO-2008-115933 | 9/2008 |

OTHER PUBLICATIONS

First Action Interview Office Action for U.S. Appl. No. 13/027,235; Applicant: McAlister Technologies, LLC.; Date of Mailing: Oct. 20, 2011. pp. 1-4.

International Search Report and Written Opinion for U.S. Appl. No. PCT/US11/024813; Applicant: McAlister Technologies, LLC; Date of Mailing: Nov. 30, 2011. pp. 1-12.

Non-Final Office Action for U.S. Appl. No. 12/857,554; Applicant: McAlister Technologies, LLC.; Date of Mailing: Nov. 21, 2011. pp. 1-30.

"Features." Accessed: Aug. 12, 2010. <http://www.pre.nl/simapro/simapro_lca_software.htm>. pp. 1-7.

"GaBi Software: Results and Interpretation." Accessed: Aug. 12, 2010. <http://www.gabisoftware.com/software/gabi-4/results-and-interpretation/>. p. 1.

California Clean Air Conversions, LLC. Advanced Green Innovations, LLC. "Meeting California's 2010 Vision: Renewable Hydrogen Production and Fleet Conversion" 2010. p. 1.

Fernando, Vincent. "Exxon: Here's Why We Just Spent $41 Billlion on Natural Gas." Business Insider. Published: Dec. 14, 2009. Web. <http://www.businessinsider.com/exxon-heres-why-we-just-spent-41-billion-on-natural-gas-2009-12>. p. 1-8.

Holdren, John P. "Meeting the Climate-Change Challenge." Lecture Slides. The John H. Chafee Memorial Lecture. Washington DC. Jan. 17, 2008. pp. 1-52.

International Maritime Organization. "Prevention of Air Pollution from Ships." Marine Environment Protection Committee. 59th Session, Agenda Item 4. Apr. 9, 2009. pp. 1-289.

International Search Report and Written Opinion for Application No. PCT/US2010/002260; Applicant: McAlister Technologies, LLC.; Date of Mailing: Apr. 28, 2011. pp. 1-8.

International Search Report and Written Opinion for Application No. PCT/US2010/045664; Applicant: McAlister Technologies, LLC.; Date of Mailing: Apr. 15, 2011. pp. 1-8.

International Search Report and Written Opinion for Application No. PCT/US2010/045674; Applicant: McAlister Technologies, LLC.; Date of Mailing: Apr. 29, 2011. pp. 1-9.

McAlister, Roy. "Maximizing Renewable Energy Efficiencies: A Full Spectrum Approach." Feb. 2009. pp. 1-21.

McAlister, Roy. "Sustainable Hydrogen Hyway." California Clean Air Conversions, LLC. Advanced Green Innovations, LLC. 2010. pp. 1-6.

Murray, Don. "World Energy Park." Starpoint Solar. Presentation. Accessed: Jun. 4, 2009. pp. 1-33.

Zhang et al., "Economic Modelling Approaches to Cost Estimates for the Control of Carbon Dioxide Emissions," Energy Economics, 1998, vol. 20, pp. 101-120.

Management's Discussion and Analysis—Yamana Gold for the Year Ended Dec. 31, 2009, http://www.yamana.com/Theme/Yamana/files/Yamana%20Gold%20Inc%202009%20MD &a%20and%20FS.pdf.

Muradov et al, "From hydrocarbon to hydrogen-carbon to hydrogen economy", International Journal of Hydrogen Energy, vol. 30, 2005, pp. 225-237.

Turner, John A., "A Realizable Renewable Energy Future", Science, vol. 285, 1999, pp. 687-689.

Supplemental European Search Report for Application EP10814156.5; Applicant McAlister Technologies. LLC.; Date of Mailing Mar. 18, 2014. pp. 1-7.

\* cited by examiner

ENERGY SYSTEM FOR DWELLING SUPPORT

CROSS-REFERENCE TO RELATED APPLICATION

The present application claims priority to and the benefit of U.S. Provisional Application No. 61/304,403, filed Feb. 13, 2010 and titled FULL SPECTRUM ENERGY AND RESOURCE INDEPENDENCE. The present application is a continuation-in-part of each of the following applications: U.S. patent application Ser. No. 12/707,651, filed Feb. 17, 2010 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010 and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety.

BACKGROUND

The world economy is dependent upon energy generated by annual combustion of more than one million years of fossil accumulations such as coal, natural gas and oil. Present practices for producing electricity from fossil and nuclear fueled central power plants are very inefficient. Most electricity is produced by driving a generator with a heat engine such as a steam turbine or gas turbine that is fueled by coal and to a lesser extent by natural gas, oil, or nuclear fuels.

Original production of fossil hydrocarbons such as coal, oil and natural gas started with photosynthesis at a time in the distant past between 60 million and 500 million years ago. Biomass produced by photosynthesis is less than 1% efficient and only a small amount of biomass became anaerobically processed in geological circumstances that resulted in preservation of fossil fuels. Thus burning a fossil fuel in a power plant that claims to be 40% to 60% efficient actually provides far less than 0.5% conversion of solar energy into electricity.

Enormous consumption of fossil fuels has enabled the U.S. to lead the world in economic development. Some 200 billion barrels of domestic oil and more or less equal energy equivalents as natural gas and coal have been burned. About 5% of the world's six billion humans in the U.S. consume 25% of world oil production, but U.S. reserves have been depleted to only 2% of total world reserves. Natural gas production has failed to keep pace with demand that has shifted from oil. Coal is now shipped great distances by rail car and slurry pipelines from cleaner mine deposits in efforts to meet environmental protection standards.

Ageing U.S. power plants import nuclear fuel and world supplies of fissionable fuels are declining in close correlation to the fossil hydrocarbon fuels. It would require more than 1,600 nuclear power plants to produce the 95 Quads of energy now consumed yearly by the U.S. Nuclear power is not a viable option.

Dwellings such as homes, office buildings and manufacturing plants typically purchase electricity from fossil fueled central power plants and use a fluid fuel such as natural gas or propane for space heating and water heating. Typical central power plants reject some 50-70% of the heat released by fossil fuel combustion as an accepted necessity of the thermodynamic cycles utilized by electricity utilities. If dwellings had access to the energy rejected from distant central power plants, virtually all of the space and water heating could be accomplished without incurring the cost, pollution, and resource depletion now incurred by burning a fossil fuel at the dwelling to produce these needs.

Most of the world's population is deprived of the standard of living typical in the U.S. because of the high cost of electricity production, water heating, and air conditioning as provided by central power plants, liquefied petroleum or oil fired water heaters, and electric powered air conditioners. As easily exploited fossil fuel supplies are depleted, conservation of energy becomes increasingly important to all nations.

Much of the world population suffers from occasional or incessant diseases due to air and water born pathogens and in other instances from inorganic poisons such as radon, arsenic, and other heavy metals. Considerable loss of food value or contamination results from attack by rodents, bugs and inappropriate food preservation practices and causes disease and malnutrition. These problems have proven to be extremely difficult to solve.

Within the next decade the global economy must rapidly develop sustainable energy supplies or accept precipitous productivity losses. It is immoral to accept the hardships that will follow without a sustainable economy.

SUMMARY OF THE INVENTION

The present disclosure is directed to an energy system for a dwelling, comprising an inner tank and a generator within the inner tank. The inner tank contains a first fluid surrounding at least a portion of the generator, and the generator is configured to produce electricity for the dwelling. In some embodiments, the energy system includes an outer tank containing at least a portion of the inner tank at least partially submerged within a second fluid, and an exhaust port operably coupled to the generator to receive exhaust fumes from the generator. The exhaust port can pass through the second fluid to exchange heat from the exhaust fumes to the second fluid. The energy system can further include a fluid outlet operably coupled to the outer tank to deliver the heated second fluid from the outer tank for use by the dwelling.

The present disclosure is further directed to a method for providing energy to a dwelling. The method comprises operating an engine positioned within a first tank containing a first fluid. The first fluid is configured to absorb energy from the engine in the form of at least one of acoustic, vibration, and heat energy. The method also includes passing exhaust fumes from the engine through an exhaust port, and exchanging heat from the exhaust fumes to a second fluid held within a second tank. At least a portion of the first tank is submerged within the second fluid within the second tank. In some embodiments, the second fluid is configured to absorb energy from the first fluid within the first tank.

The present disclosure is also directed to an energy system comprising an engine and generator for producing electricity and heat, and an exhaust line configured to receive exhaust from the engine. The system also includes a fluid storage tank through which the exhaust line passes to exchange heat with the fluid in the fluid storage tank. The system further includes a condensation collector for collecting water condensed in the exhaust line, and a heat exchanger operably connected to the fluid storage tank and configured to receive the fluid from the fluid storage tank and deliver heat from the fluid to a dwelling.

DETAILED DESCRIPTION

The present application incorporates by reference in its entirety the subject matter of U.S. Provisional Patent Application No. 60/626,021, filed Nov. 9, 2004 and titled MULTI-FUEL STORAGE, METERING AND IGNITION SYSTEM. The present application incorporates by reference in their entirety the subject matter of each of the following U.S. Patent Applications, filed concurrently herewith on Aug. 16, 2010 and titled: METHODS AND APPARATUSES FOR DETECTION OF PROPERTIES OF FLUID CONVEYANCE SYSTEMS (U.S. application Ser. No. 12/806,634); COMPREHENSIVE COST MODELING OF AUTOGENOUS SYSTEMS AND PROCESSES FOR THE PRODUCTION OF ENERGY, MATERIAL RESOURCES AND NUTRIENT REGIMES (U.S. Application No. 61/401,699); ELECTROLYTIC CELL AND METHOD OF USE THEREOF (U.S. patent application Ser. No. 12/806,633); SUSTAINABLE ECONOMIC DEVELOPMENT THROUGH INTEGRATED PRODUCTION OF RENEWABLE ENERGY, MATERIALS RESOURCES, AND NUTRIENT REGIMES (U.S. application Ser. No. 12/857,553); SYSTEMS AND METHODS FOR SUSTAINABLE ECONOMIC DEVELOPMENT THROUGH INTEGRATED FULL SPECTRUM PRODUCTION OF RENEWABLE ENERGY (U.S. application Ser. No. 12/857,541); SUSTAINABLE ECONOMIC DEVELOPMENT THROUGH INTEGRATED FULL SPECTRUM PRODUCTION OF RENEWABLE MATERIAL RESOURCES USING SOLAR THERMAL (U.S. application Ser. No. 12/857,551); INCREASING THE EFFICIENCY OF SUPPLEMENTED OCEAN THERMAL ENERGY CONVERSION (SOTEC) SYSTEMS (U.S. application Ser. No. 12/857,546); GAS HYDRATE CONVERSION SYSTEM FOR HARVESTING HYDROCARBON HYDRATE DEPOSITS (U.S. application Ser. No. 12/857,228); APPARATUSES AND METHODS FOR STORING AND/OR FILTERING A SUBSTANCE (U.S. application Ser. No. 12/857,515); ENERGY CONVERSION ASSEMBLIES AND ASSOCIATED METHODS OF USE AND MANUFACTURE (U.S. application Ser. No. 12/857,433); and INTERNALLY REINFORCED STRUCTURAL COMPOSITES AND ASSOCIATED METHODS OF MANUFACTURING (U.S. application Ser. No. 12/857,461).

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this Specification are not necessarily all referring to the same embodiment. Furthermore, the particular features, structures, or characteristics may be combined in any suitable manner in one or more embodiments. In addition, the headings provided herein are for convenience only and do not interpret the scope or meaning of the claimed disclosure.

Figure 1:
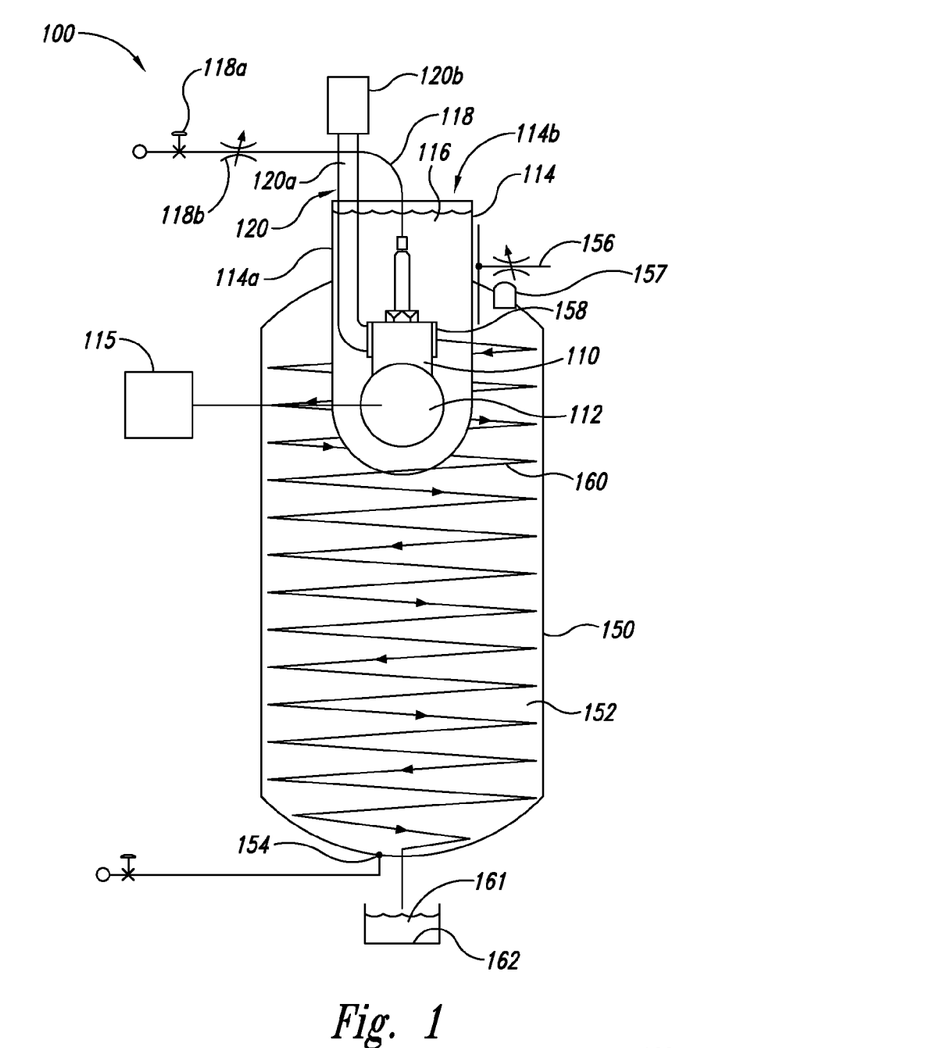
FIG. 1 is a partially schematic circuit diagram of an energy system for a dwelling according to several embodiments of the present disclosure.

FIG. 1 shows an energy system 100 according to several embodiments of the present disclosure. The energy system 100 includes an engine 110 and a generator 112 held within an inner tank 114. The engine 110 can include a fuel line 118 and an air intake 120 that extend out of the inner tank 114 to provide needed materials, such as fuel and air, to the engine 110. The fuel line 118 can include an appropriate valve 118a and flow-regulator 118b, and other appropriate fuel management equipment. Additional details about the fuel delivery and management equipment are disclosed in copending U.S. patent application Ser. No. 09/128,673 titled "ENERGY CONVERSION SYSTEM," which is incorporated herein in its entirety. The air intake 120 can include an upwardly extending pipe 120a and an air filter 120b at an end of the pipe 120a. In some embodiments, the engine 110 comprises an internal combustion engine 110. The engine 110 and generator 114 can include a flywheel to start and stabilize rotation of the engine 110, and to provide electricity after the engine 110 reaches a desired speed of operation. The engine 110 and generator 112 can provide energy in the form of electricity for a dwelling or other small or moderate-scale consumption unit such as a store or outpost. An inverter 115 can receive electricity from the generator 112 and convert the electricity into an appropriate format for use by the dwelling. The inner tank 114 can include tubular walls 114a extending upward above the engine 110. The inner tank 114 can include a vent 114b atop the inner tank 114, which may include a roof (not shown) or other closure on the vent 114.

The inner tank 114 can be filled (or substantially filled) with a fluid 116 such as a suitable low vapor pressure fluid. For example, the fluid 116 can be a high temperature silicone, fluorocarbon, or suitable eutectic solution (or a mixture thereof) that can provide sound attenuation and heat-transfer. In some embodiments, the fluid 116 can include a self-extinguishing fluid, or a fire proof fluid to buoy exhaust fluid or leaked fuel or lubricant from the engine 110 to a surface of the fluid 116 to be vented out of the system 100. The fluid 116 can also include a dielectric fluid to provide added insulation of high voltage leads from generator 112 and of accompanying circuitry and cabling. The fluid 116 can also include sulfur hexafluoride, sand, aluminum or steel balls, potassium hydroxide, or other media that provides for noise attenuation and improved fire proofing of the assembly by forcing displacement of leaked vapors, smothering by displacement of air or other oxidants, and by providing quenching capacity. The term "fluid" as used herein includes liquids and particulate solids such as sand or metal balls. In embodiments including particulate solids, a mixture of sizes of particulates can be used to fit within spaces and openings of various sizes within the inner tank 114.

The inner tank 114 can be within an outer tank 150 that can be filled with a fluid 152. In some embodiments, the fluid 152 is potable water. The outer tank 150 can be made of a polymer-lined composite that is reinforced by high strength fiber glass, carbon or polymer windings. This construction enables the tank 150 to be inherently insulated and corrosion resistant for an extremely long service life. The outer tank 150 can include an inlet 154 at a base of the outer tank 150, and an outlet 156 at a top of the tank 150. The engine 114 can include an exhaust port 158 connected to a heat-exchanging tube 160. The tube 160 can wind throughout the outer tank 150 in a helical or other appropriate fashion to transfer heat from the exhaust within the tube 160 to the fluid 152 within the outer tank 150. In the embodiment pictured in FIG. 1, the heat-exchanging tube 160 winds helically about a generally vertical axis within a generally cylindrical outer tank 150. In other embodiments, other arrangements are possible to achieve an appropriate level of heat exchange between the exhaust in the tube 160 and the fluid 152 in the tank 150.

The outer tank 150 can also include a condensation collector 162 at an exit of the tube 160 to collect condensation 161 from the exhaust. In embodiments in which the engine 110 uses hydrogen as fuel, approximately nine pounds of distilled quality water are produced from each pound of hydrogen that is used as fuel in the engine 110. In some embodiments, the engine 110 can produce water and heat according to equations 1 and 2 below:

$$H2 + \tfrac{1}{2} O2 \rightarrow H2O + HEAT1 \qquad \text{Equation 1}$$

$$1 \text{ lb hydrogen} + 8 \text{ lbs oxygen} \rightarrow 9 \text{ lbs water} \qquad \text{Equation 2}$$

In other embodiments, a hydrocarbon fuel such as a fuel alcohol, liquefied petroleum, fuel oil, or methane produced from sewage, garbage, farm wastes and other sources is used. Water may be condensed from the products of combustion as shown by the processes summarized in Equations 3 and 4.

$$HxCy + yO2 \rightarrow xH2O + yCO2 + HEAT3 \qquad \text{Equation 3}$$

$$CH4 + 2O2 \rightarrow 2H2O + CO2 + HEAT4 \qquad \text{Equation 4}$$

In many areas of the world serious loss of productivity and misery results from chronic illnesses and shortened life spans that are caused by bad water. Collection of water from the exhaust products of the energy conversion process is extremely important for assisting communities that are troubled with water-borne pathogens or in which ground water is unsuitable due to arsenic, lead, radon, or other inorganic poisons. The system 100 provides for safe and clean collection of about one gallon of water per pound of hydrogen that is used as fuel in a fuel cell or engine and does so in a cascade of energy utilization events that greatly improve the quality of life while conserving energy supplies.

The arrangement of the inner tank 114 and the outer tank 150 advantageously encases energy from the engine 110 and transfers the energy to the fluids 116, 152 in the tanks 114, 150. The outer tank 150 can be a vessel such as a cylinder, or as a cylinder with baffles, or as a vessel with heat transfer fins inside and or outside, or as a vessel with provisions for depressing convective flow of heated fluids in the tank 150. Heat, sound, and vibration are therefore not transmitted substantially out of the system 100, but are used to heat and/or pressurize the fluid 152 within the outer rank 150. In some embodiments, the fluid 152 is hot, potable water that can be used by the dwelling. The outlet 156 can be connected to appropriate plumbing ports in the dwelling. The outlet 156 can include a pressure sensor 157 that triggers the outlet 156 to release pressure from the outer tank 150 if the pressure or temperature reaches a threshold pressure.

Several particularly synergistic and beneficial results are provided by the system 100. For example, the heat and vibration energy caused by pulse combustion, as well as the noise, are substantially captured as heat in the fluid 152 for productive use. Additionally, some combustion processes can produce large amounts of water in the exhaust. The system 100 can capture this water, which is generally clean and usable, for productive use. These benefits are applicable to virtually any engine type, including combustion engines and fuel cells. The engine 110 can be a fuel cell that produces water and noise that are likewise captured as clean water and energy, respectively, in the fluid 152.

Figure 2:
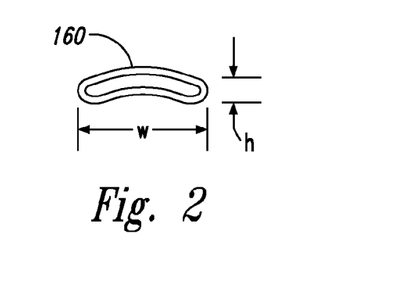
FIG. 2 is a cross sectional view of an exhaust tube according to several embodiments of the present disclosure.

FIG. 2 shows a cross-sectional view of the heat-exchanging tube 160. In some embodiments, the tube 160 can be a flattened tube 160. In some embodiments, the outer tank 150 can contain fins or channels that generally follow the path of the tube 160 through the tank 150. The current from the inlet 154 to the outer 156 can therefore run counter to the path of the exhaust within the tube 160. Accordingly, the width and height dimensions, w and h, may vary as needed to assure that inlet water does not travel in convective or other paths but moves in a countercurrent heat exchanging arrangement.

In some embodiments, the tube 160 can be a bowed tube with a generally crescent overall cross sectional shape in which the middle portion is bowed upward to assist in directing the flow of heated and thus expanded water to be kept within the bowed underside of the tube 160 by buoyant forces. The tube 160 can fit within the outer tank 150 with the tube 160 winding helically throughout the tank 150, while leaving a countercurrent path through the tank 150 along which fluid 152 can pass from the inlet 154 to the outlet 156. This arrangement increases the efficiency of the system, and allows the fluid 152 to reach a reliable, consistent temperature at the outlet 156.

Figure 3:
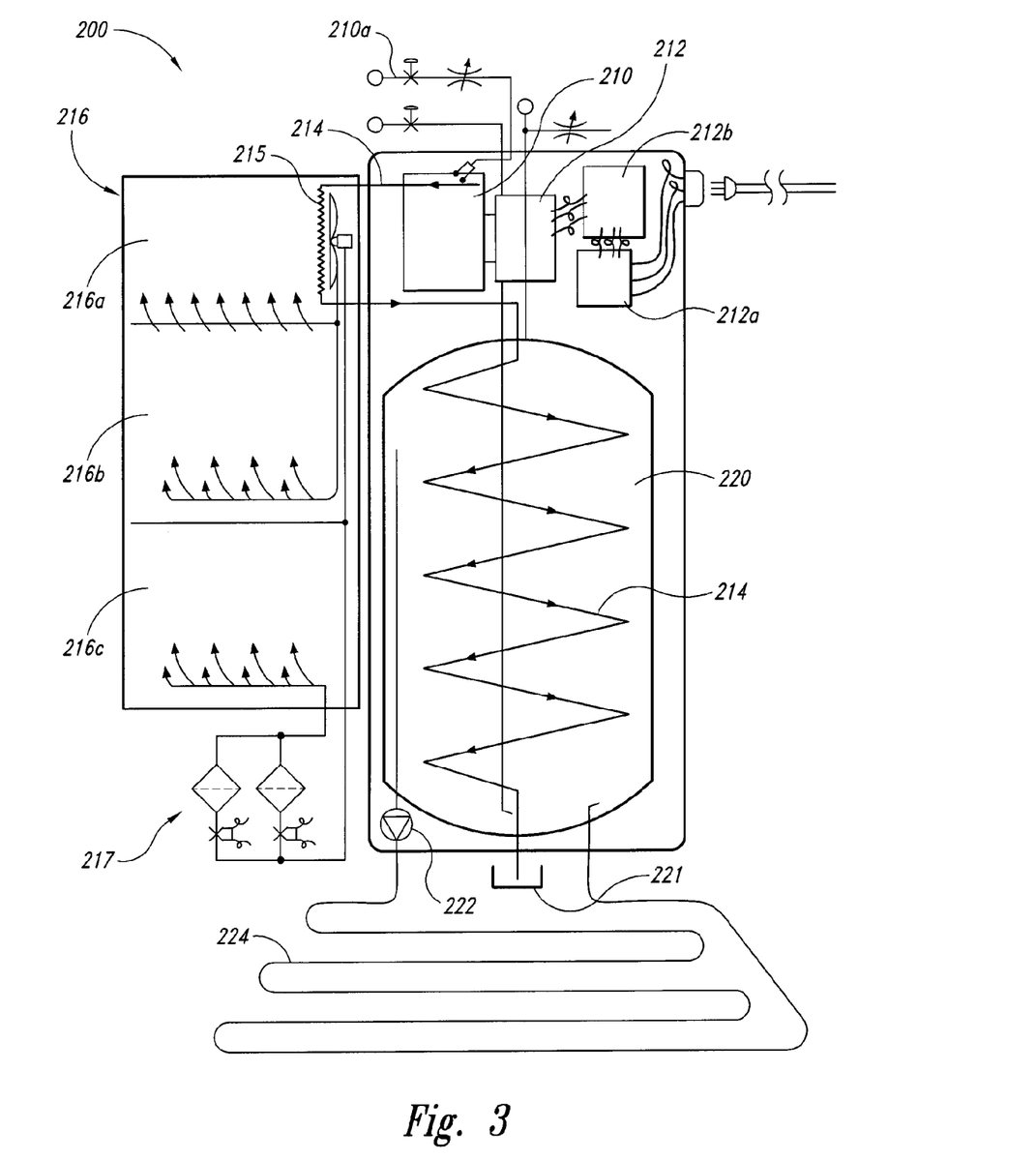
FIG. 3 is a partially schematic circuit diagram of an energy system for a dwelling according to several embodiments of the present disclosure.

FIG. 3 shows a system 200 according to several embodiments of the present disclosure. The system 200 includes an engine 210 and a generator 212. The engine 210 can be an internal combustion engine, a fuel cell, or any other appropriate engine type. The engine 210 includes input lines 210a to provide the engine 210 with materials such as fuel, air, hydrogen, or any other appropriate material for use in the engine 210. The fuel can be delivered through the input lines 210a as described in copending patent application entitled "FULL SPECTRUM ENERGY AND RESOURCE INDEPENDENCE," referenced above, and incorporated by reference in its entirety. The generator 212 can be coupled to the engine 210 to convert energy from the engine 210 to electricity. The system 200 can include an inverter 212a and other suitable electrical equipment 212b, such as cabling, electrolyzers, batteries, capacitors, etc., to deliver electricity from the generator 212 to a dwelling.

The system 200 can also include an exhaust line 214, a heat exchanger 215, and an oven 216. The heat exchanger 215 can transfer heat from the exhaust to the oven 216. The oven 216 can include several ovens of cascading heat levels, connected by a network of heat exchangers. For example, the oven 216 can include a first oven 216a that receives the exhaust heat first; a second oven 216b that receives the heat from the first oven 216b; and a third oven 216c that receives the heat from the second oven 216c. The air in the oven 216 can be distributed among the several ovens 216a, 216b, and 216c through a series of valves and regulators 217. The first oven 216a can be used to cook at the highest desirable temperatures, for example for a pizza oven. The second oven 216b can be used to cook at a slightly lower temperature, and the third oven 216c can be used to cook at an even lower temperature, such as to dry or preserve food. At least one of the ovens 216 can include a microwave oven. The oven 216 can include a desiccant filter (not shown) to dry air within the oven 216. The desiccant filter can be periodically refreshed using hot exhaust from the engine 210. Drying of fruits, meats and vegetables offer healthful, energy conserving, and advantageous alternatives for food preservation and compact storage. The system 200 provides quick and disease vector-free drying and preservation of food.

The system 200 also includes a tank 220 through which the exhaust line 214 can pass to heat fluid, such as water, in the tank 220 after the exhaust passes through the oven 216. In some embodiments, a suitable corrosion resistant material such as stainless steel can be used for construction of heat exchanger 215 and the tube 214. Alternative materials for the heat exchanger 215 include high temperature polymers which provide cost effective anticorrosion benefits. The tube 214 can be made of polyester, silicone, and/or fluoropolymers. The arrangement of the exhaust line 214 and tank 220 can be generally similar to the system 100 described above with reference to FIG. 1 above. The system 200 can include a condensation collector 221 near an exhaust port. In some embodiments, for example where sound, heat, and vibration attenuation are a priority, the engine 210 and generator 212 can be situated within an inner tank (not shown) that is in turn found within the tank 220 in a manner generally similar to the system 100 described in connection with FIG. 1. The fluid in the tank 220 can be potable water, and can be used for drinking, bathing, washing etc. within the dwelling. In some embodiments, the water (or other fluid) can be used to heat the dwelling as well. The tank 220 can include an outlet 222 connected to a heat exchanger 224 including a series of tubes winding through walls, a ceiling, and a floor of a dwelling. The dwelling can include insulation between the heat exchanger 224 and an external surface of the dwelling, but can be transmissive of heat to the interior of the dwelling. The water can return from the heat exchanger 224 to the tank 220, or it can be used in the dwelling as potable water. The tank 220 can be constructed to produce and keep hottest water at the top of tank 220 and coldest water at the bottom of tank 220 by depressing or preventing mixing due to entering water momentum and/or convective currents.

Provision of a series of heat utilizations at cascading temperatures starting with internal combustion or high temperature fuel cell operation followed by thermochemical regeneration of primary fuels to more energy yielding fuel species, heat exchange for cooking food, drying food, heating water, and using heated water in a fan coil or floor heating system greatly improves over conventional dwelling support practices. Overall energy utilization efficiency is increased compared to present practices. Energy security along with assured water production and pasteurization or sterilization are provided as inherent benefits.

Figure 4:
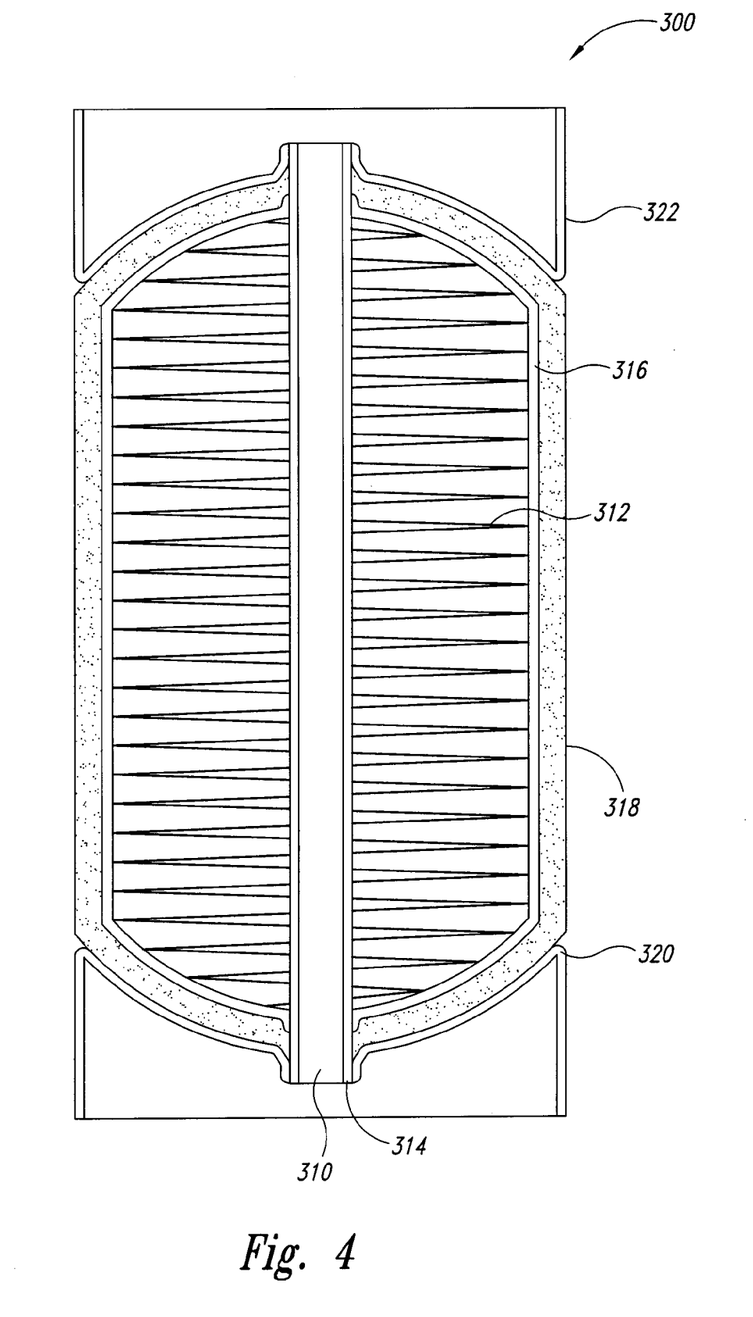
FIG. 4 is a cross sectional view of a tank for use with an energy system according to the present disclosure.

FIG. 4 illustrates a cross-sectional view of a tank 300 according to embodiments of the present disclosure. The tank 300 can be made of metal or a polymer such as polyvinylidene fluoride or perfluoroalkoxy. The tank 300 can include a central shaft 310 that can be hollow or solid, and can include an axial tubular member 314. In some embodiments, the bore of the shaft 310 can be used as a central conduit for connecting appropriate delivery tubes to pump to and from various locations within energy systems 100 and 200, and to external destinations. A helical tube 312 can extend around the shaft 310 within the tank 300. FIG. 4 illustrates the tube 312 conceptually as a line; however, it is to be understood that the tube 312 can have any appropriate dimension within the tank 300. The helical shape of the tube 312 can reinforce the tank 300 from within. The tank 300 can be rapidly manufactured by forming a polymer tube in the helical form shown in FIG. 4 (which may or may not include forming around and bonding to a shaft 310). An impermeable liner 316 can be thermoformed over and bonded to the outside surfaces of the tube 312. The tank 300 can include an overwrap 318 made of fiberglass, oriented polyolefin, oriented polyester, and/or graphite fiber in a suitable thermoset such as epoxy. In embodiments in which a central shaft 310 is incorporated, end reinforcements such as conformal bulkheads 320 and 322 can provide axial load spreading and reinforcement along with mounting provisions. Bonding shaft 310 to bulkheads 320 and 322 or providing load transfer by threaded fasteners or similar attachment thus provides axial arrestment of pressure stresses in the tank 300.

Figure 5:
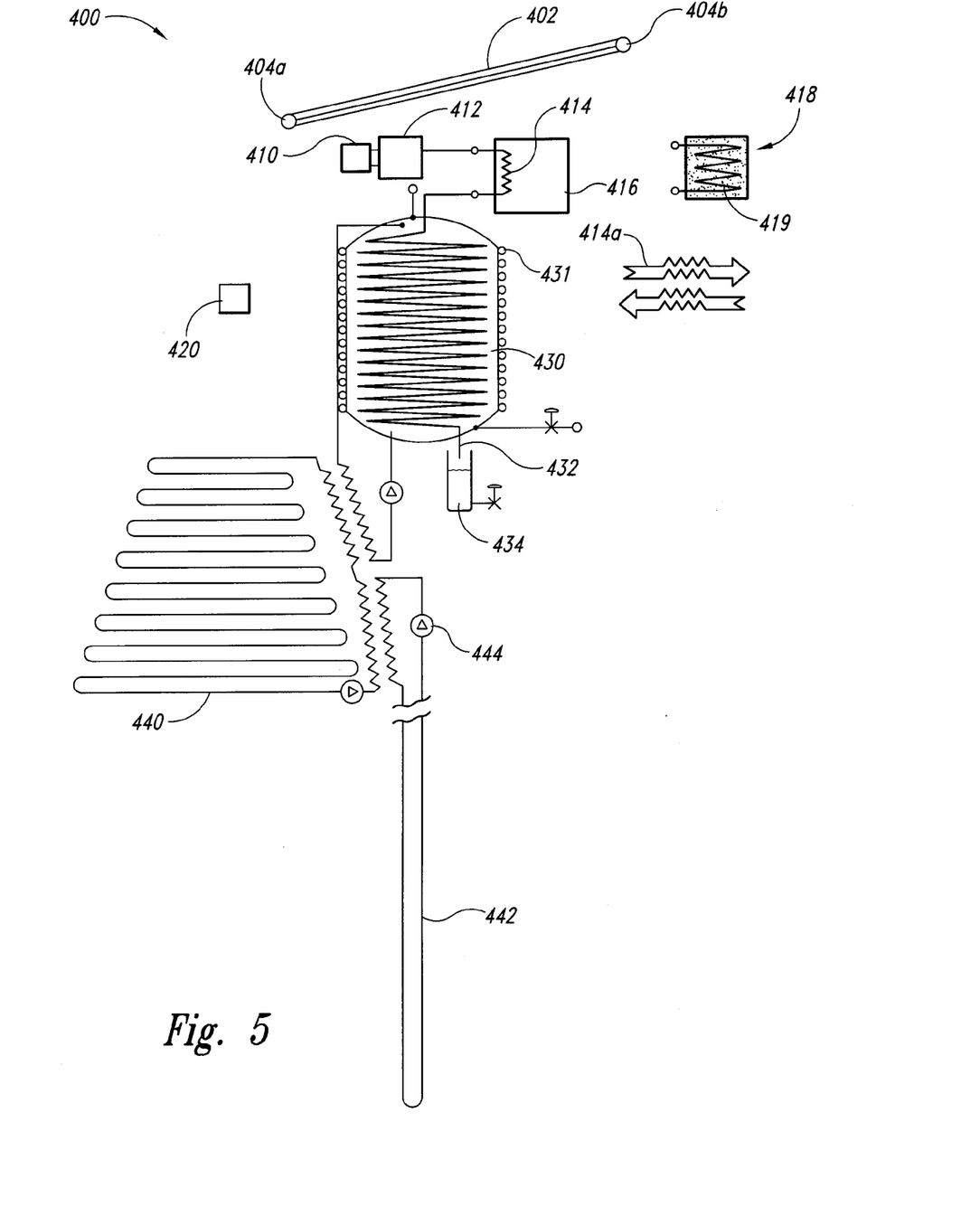
FIG. 5 is a partially schematic diagram of an energy system according to several embodiments of the present disclosure.

FIG. 5 illustrates an energy system 400 for a dwelling or other consumption unit according to embodiments of the present disclosure. The system 400 includes solar panels 402 that receive solar energy and convert the energy into heat and electricity for the dwelling. The heat can be removed from the solar panels 402 by a working fluid such as air and/or water by passing the fluid from a first manifold 404a to a second manifold 404b. The system 400 can also include an engine 410 and a generator 412 similar to systems 100 and 200 described above. Exhaust from the engine 410 and generator 412 can be transferred to a heat exchanger 414 within a container 416. The container 416 can be any compartment in which heat from exhaust can be used, including an oven or a heating unit for a dwelling. The heat exchanger 414 can use countercurrent air by moving two fluids against one another as illustrated by arrows 414a. Alternatively, the exhaust can be passed through a thermal storage tank 418. The thermal storage tank 418 may contain a high specific heat media 419 and/or a change of phase substance such as Glaber salt (Na2SO4.10H2O) or paraffin to heat or cool fluid adaptively circulated through the thermal storage tank 418. The manifolds 404a, 404b can direct heat from the solar panels 402 to the thermal storage tank 418 for later use elsewhere.

The system 400 can include a tank 430, and exhaust tubes 432 that pass through the tank 430, and a condensation collector 434, similar to the systems 100, 200 described above with reference to FIGS. 1 and 3. The fluid in the tank 430 can be heated from the exhaust from the engine 410, or from the thermal storage tank 418 as needed. The tank 430 can include heat storage coils 431 surrounding the tank 430. The hot fluid in the tank 430 can be cycled to a heat exchanger 440 in a floor or wall of a dwelling to heat the dwelling before returning to the tank 430. The system 400 can include a controller 420 that provides control of the engine 410 and/or generator 412, and sensors that receive temperature and/or humidity information. The controller 420 can adaptively control circulation of working fluids in various portions of the system 400. The system 400 can also include a geothermal storage return bend 442 that extends below the surface of the earth where temperatures are generally more moderate than at the surface of the earth. The fluid in the return bend 442 can be moved by a pump 444 or other appropriate pressurizing equipment. The heat exchanger 440 can exchange heat to the return bend 442, which can transfer the heat to a geothermal bank below the surface of the earth. The system 400 can circulate well water or water that has been cooled in a heat exchanger (not shown) that is buried in the soil at a sufficient depth to allow the water circulated in heat exchanger 440 to achieve the mean annual air temperature. In most continents the saturated zone of a ground water aquifer remains very close to the mean annual air temperature plus one degree for each 80' of overburden to the surface. During cold weather months, this ground water is warmer than the ambient air temperature. During warm weather months, the ground water is often 20° F. to 40° F. cooler than the ambient air temperature and readily serves as a heat sink for cooling a dwelling. Similarly in areas near deep ocean water it is often found that adequately cool water is available from the ocean depths to readily cool a dwelling.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. An energy system for a dwelling, comprising:
   an inner tank;
   a generator within the inner tank, wherein the inner tank contains a first fluid surrounding at least a portion of the generator, the generator being configured to produce electricity for the dwelling;
   an outer tank having an open cavity that extends between opposite first and second end portions; the first end portion of the outer tank containing at least a portion of the inner tank, which is at least partially submerged within a second fluid disposed within the open cavity of the outer tank;
   an exhaust port operably coupled to the generator to receive exhaust fumes from the generator, the exhaust port passing through the second fluid to exchange heat from the exhaust fumes to the second fluid; the exhaust port comprising an elongated tube having a crescent-shaped cross section, with opposite end portions and a middle portion, to improve heat transfer from the exhaust fumes to the second fluid; the elongated tube being shaped to helically wind along a substantial length of a long axis of the outer tank and positioned such that the middle portion of the crescent-shaped cross section is bowed in an upward direction toward the upper end portion of the outer tank, the elongated tube extending between the generator and an exit port associated with the second end portion of the outer tank such that an exhaust pathway is directed from the generator toward the exit port;
   a fluid outlet operably coupled with the first end portion of the outer tank to deliver the heated second fluid from the outer tank for use by the dwelling; and
   a fluid inlet operably coupled with the second end portion of the outer tank such that an outer tank fluid pathway is directed from the fluid inlet at the second end portion of the outer tank toward the fluid outlet at the first end portion of the outer tank.

2. The energy system of claim 1 wherein the fluid in the outer tank comprises potable water.

3. The energy system of claim 1 wherein the first fluid comprises at least one of high-temperature silicone, fluorocarbon, a eutectic solution, a self-extinguishing fluid, a dielectric fluid, sulfur hexafluoride, sand, potassium hydroxide, or metal balls.

4. The energy system of claim 1 wherein the exhaust port comprises a fluid collector configured to collect water from the exhaust fumes.

5. The energy system of claim 1, further comprising
   a fuel line configured to deliver fuel to the generator; and
   an air intake configured to deliver air to the generator, wherein the generator comprises a combustion engine.

6. The energy system of claim 1 wherein:
   the outer tank comprises a generally cylindrical, upright tank;
   the inner tank is positioned generally centrally within the outer tank near a top of the outer tank.

7. The energy system of claim 1 wherein the inner tank comprises an upper vent, and wherein vapors from the first fluid migrate toward a surface of the first fluid and out of the upper vent.

8. The energy system of claim 1 wherein the fluid outlet further comprises a pressure sensor configured to release a portion of the second fluid from the outer tank if pressure within the outer tank reaches a threshold pressure.

9. The energy system of claim 1 wherein the inner tank is configured to absorb heat, vibration, and acoustic energy from the generator and transfer the energy to the second fluid as heat.

10. The energy system of claim 1 wherein the generator receives energy from an engine, and stores at least a portion of the energy in a flywheel.

11. The energy system of claim 1, further comprising a solar panel and a heat exchanger configured to remove heat from the solar panel and transfer the heat to the second fluid.

12. The energy system of claim 1, further comprising a heat exchanger configured to receive the second fluid and transfer heat from the second fluid to a dwelling.

13. The energy system of claim 12 wherein the heat exchanger comprises a series of tubes through which the second fluid passes, and wherein the series of tubes are positioned in an interior surface of the dwelling.

14. The energy system of claim 1 wherein the outer tank comprises a cover wrapped over an outer circumference of the helical shape.

15. The energy system of claim 14 wherein the cover is made from at least one of fiberglass, oriented polyolefin, oriented polyester, and graphite fiber in a thermoset epoxy.

16. The energy system of claim 1, further comprising a thermal storage tank configured to receive heat from the exhaust fumes and store the heat, wherein the thermal storage tank is made of at least one of Glaber salt ($Na_2SO_4.10H_2O$) or paraffin.

17. The energy system of claim 1 wherein the exhaust port is configured to transfer heat from the exhaust to an oven.

18. The energy system of claim 17 wherein the oven comprises a plurality of ovens, and wherein the ovens are connected by a heat exchanger network configured to exchange heat between the plurality of ovens.

19. The energy system of claim 1 further comprising an exhaust outlet adjacent a terminal end portion of the elongated tube and associated with the second end portion such that an exhaust fluid pathway extends from the generator toward the exhaust outlet; the exhaust fluid pathway running counter to the outer tank fluid pathway.

20. An energy system for a dwelling, comprising:
an inner tank;
a generator within the inner tank, wherein the inner tank contains a first fluid surrounding at least a portion of the generator, the generator being configured to produce electricity for the dwelling;
an outer tank having an open cavity that extends between opposite upper and lower end portions; the outer tank containing at least a portion of the inner tank, adjacent the upper end portion, at least partially submerged within a second fluid;
an exhaust port operably coupled to the generator to receive exhaust fumes from the generator, the exhaust port passing through the second fluid to exchange heat from the exhaust fumes to the second fluid; the exhaust port comprising an elongated tube having a crescent-shaped cross section, with opposite end portions and a middle portion, to improve heat transfer from the exhaust fumes to the second fluid; the elongated tube being shaped to helically wind along a substantial length of a long axis of the outer tank and positioned such that the middle portion of the crescent-shaped cross section is bowed in an upward direction toward the upper end portion of the outer tank; and
a fluid outlet operably coupled to the outer tank to deliver the heated second fluid from the outer tank for use by the dwelling.

21. The energy system of claim 20 wherein the elongated tube extends helically about a long axis that extends between the opposite upper and lower end portions of the outer tank; the elongated tube having a length and shape that substantially spans a length of the long axis between the opposite upper and lower end portions of the upright outer tank.

22. The energy system of claim 21 wherein the outer tank further includes a fluid inlet, coupled with the lower end portion of the outer tank; the fluid outlet being coupled with the upper end portion of the outer tank such that an outer tank fluid pathway extends from the fluid inlet at the lower end portion of the outer tank toward the fluid outlet at the upper end portion of the outer tank.

23. The energy system of claim 22 further comprising an exhaust outlet adjacent a terminal end portion of the elongated tube and associated with the lower end portion such that an exhaust fluid pathway extends from the generator toward the exhaust outlet; the exhaust fluid pathway running counter to the outer tank fluid pathway.

24. An energy system, comprising:
means for generating electricity and heat;
an exhaust line operably coupled to and configured to receive exhaust from the means for generating electricity and heat; the exhaust line extending along an exhaust pathway from the means for generating electricity and heat to an exhaust outlet, the exhaust line passing through a fluid to exchange heat from the exhaust to the fluid;
a fluid storage tank configured to store the fluid, wherein the exhaust line passes through the fluid storage tank, the exhaust line comprising an elongated tube having a crescent-shaped cross section, with opposite end portions and a middle portion, to improve heat transfer from the exhaust to the fluid, the elongated tube being shaped to helically wind along a substantial length of a long axis of the fluid storage tank and positioned such that the middle portion of the crescent-shaped cross section is bowed in an upward direction toward an upper end portion of the fluid storage tank, the fluid storage tank having a fluid inlet and a fluid outlet that define a fluid pathway through the fluid storage tank; the fluid pathway running counter to the exhaust pathway;
means for collecting water condensed in the exhaust line; and
a heat exchanger operably connected to the fluid storage tank and configured to receive the fluid from the fluid storage tank and deliver heat from the fluid to a dwelling.

25. The energy system of claim 24 wherein the heat exchanger is within an interior surface of the dwelling.

26. The energy system of claim 24, further comprising an inverter operably coupled to the means for generating electricity, the inverter being configured to deliver the electricity to the dwelling.

27. The energy system of claim 24 wherein the heat exchanger comprises a geothermal storage return bend extending into the earth and configured to transfer heat from the dwelling to the earth through the geothermal storage return bend.

28. The energy system of claim 24 wherein the means for generating electricity and heat is held within the fluid storage tank, and wherein the fluid storage tank is configured to absorb heat and vibration energy from the means for generating electricity and heat.

* * * * *